Aug. 10, 1965   G. M. BRAUER ETAL   3,199,731
AUTOMATIC ANIMAL FEEDER
Filed April 9, 1962
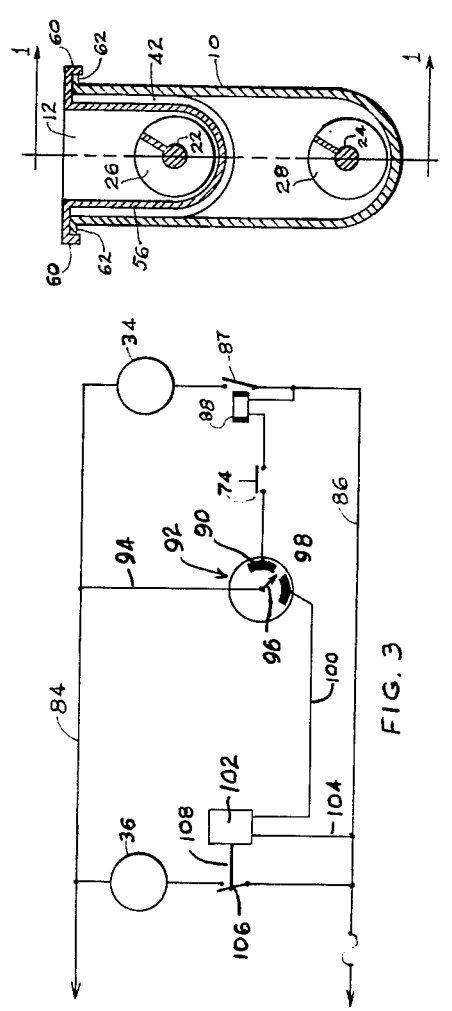
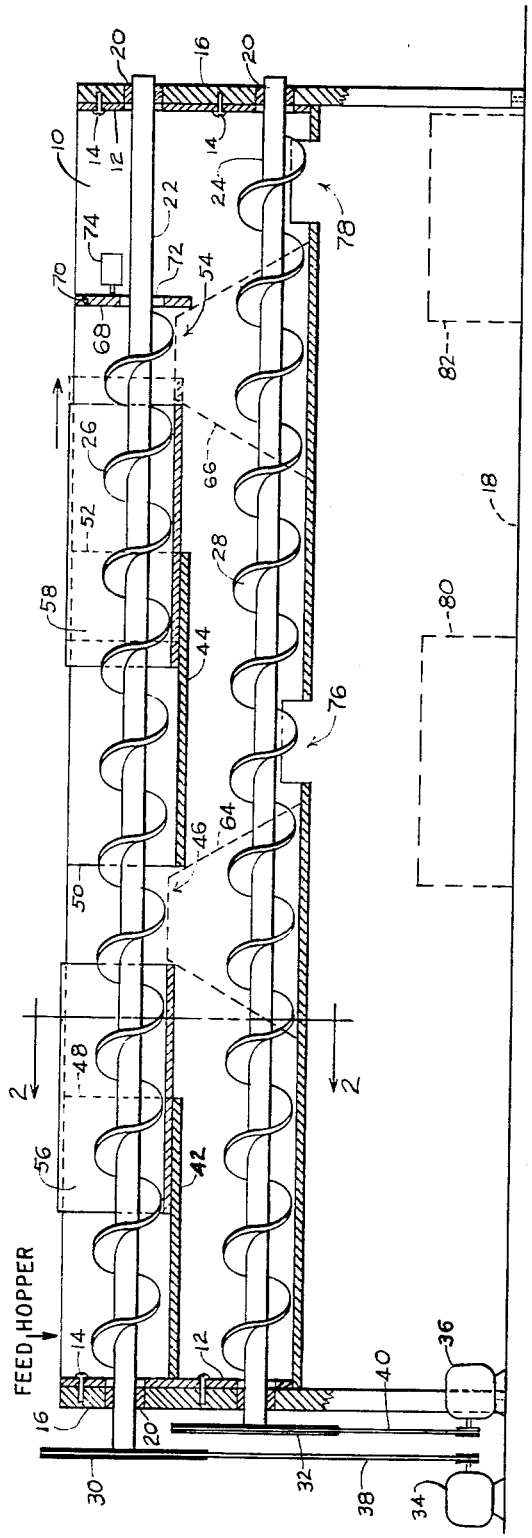
INVENTORS
GEORGE M. BRAUER
JERRY L. HARPER
BY RUSSELL L. JECKEL
ATTORNEYS

United States Patent Office 3,199,731
Patented Aug. 10, 1965

3,199,731
AUTOMATIC ANIMAL FEEDER
George M. Brauer, Oakford, Jerry L. Harper, Eureka, and Russell L. Jeckel, Delavan, Ill.
Filed Apr. 9, 1962, Ser. No. 185,890
11 Claims. (Cl. 222—56)

This invention relates to a device for the feeding of animals, particularly hogs, in which the feeding intervals and quantities are automatically regulated. In the tremendous growth strides of modern-day economy, the field of animal husbandry has been confronted with correspondingly complex problems in respect to large scale operations. In the over-all economy of this field, the feeding of animals is a problem of major importance, especially in respect to margin of profit, which may be affected by overfeeding, and also by related matters having to do with the physical well-being of the animals. Obviously, it is no longer practicable to give individual attention to stock feeding, and it is a principal object of the invention to provide an automatic system for the feeding of animals.

More particularly, it is an object to provide an animal-feeding system which is cyclically operable in programmed operations.

In still greater particular, it is an object to provide a composite feeding system, in which a reservoir of feed, in predetermined quantity is built up by action in one unit, followed by dispensing from an associated unit, which is fed, cascade-wise from the first unit.

From another standpoint, it is an object to provide a feeding system which limits the available portions to predetermined maxima, in given intervals.

These and other objects, which will be readily apparent, are attained by the present invention, which, in one embodiment may be briefly described as comprising an upper trough with a longitudinally directed feeding action, and bottom openings of variable size, and a lower trough adapted to receive heaps of feed from the openings in the upper trough, and having discharge openings spaced from said heaps, and means to move the feed from the heaps to positions over the discharge openings.

For a more detailed description of the invention, reference is made to the following specifications, as illustrated in the drawing, in which:

FIGURE 1 is a front elevation of the feeding system, with the troughs shown in section taken axially of the augers, or, along the plane of the line 1—1 of FIGURE 2.

FIGURE 2 is a transverse sectional view on a larger scale through the troughs, taken on the plane of the line 2—2 of FIGURE 1, and FIGURE 3 is a schematic view, showing the electric controls for the motors.

Referring to the drawing by characters of reference, there is shown, in FIGURE 1, a feeding system comprising a pair of vertically spaced, nested troughs, of which the larger, outer trough 10, of sheet metal, and U-form in cross section, has a pair of end closure plates 12, fitted within the trough, conforming to the shape thereof, and welded thereto, and which are, in turn, secured as by screws 14, to suitable end standards 16, which dwell on the ground or floor 18, and support the trough at an elevated position above the level 18. Each standard 16 has a pair of vertically spaced bores, provided with anti-friction bushings 20, in which are rotatively mounted the parallel shafts 22, 24, of a pair of auger blades 26, 28. At one end of the system, shafts 22, 24 are provided with pulleys 30, 32 outwardly of the end standard, the pulleys being keyed to the shafts, and driven by motors 34, 36, through belts or chains 38, 40.

The upper auger 26 is contained in a separate compartment, above the lower auger, as defined by a pair of trough sections 42, 44, secured to the inner surfaces of trough 10, at the top edges thereof, and spaced apart, longitudinally of the trough, to provide a discharge opening 46, between adjacent edges 48, 50, of the sections. The other end 52 of section 44 also terminates short of the end of auger 26, to provide a second discharge opening 54. As seen in FIGURE 2, sections 42, 44, are also U-form in section, with their bottoms located a considerable distance above the uppermost portion of the lower auger 28. From the structure thus far described it will be clear that feed introduced into trough section 42, by any suitable means, as from a hopper, or auger, will be carried along the section by the auger 26 and dropped through discharge opening 46, and subsequently, futher quantities will be carried along section 44 for discharge through opening 54.

In an important aspect of the invention, the sizes of openings 46 and 54 are adjustable by means of a pair of slidable trough sections 56, 58. The two are generally similar in form and mounting, and, as seen in FIGURE 2, section 56 is of U-form, nesting snugly within section 42, and having downwardly hooked flanges 60 at its upper edges, which engage over outwardly turned flanges 62 at the top edges of main trough 10. A close friction fit will serve to hold these slidably adjustable sections against accidental displacement, but they may be provided with positive locking means if deemed necessary or desirable.

As will be seen later, the lower auger is idle during movement of the upper auger, and, therefore, the feed falling through the first opening 46, as limited by the slidable section 56, builds up into a pyrimal heap 64 in the bottom of trough 10, and on the lower auger. When this heap is completely built up, the discharge opening is thereby closed off, and auger 26 carries the feed beyond the first discharge position, and up to the second discharge opening 54, where a second heap 66 is formed in the main trough 10. After formation of this second heap, the feed pressure of the auger is exerted on a plate 68, swingably mounted in trough 10, by means of a pivot pin 70, carried by the sides of the trough, and having an opening 72, to clear auger shaft 22. In its swing, plate 68 contacts a limit switch 74, which cuts off motor 34, and therefore stop the top auger 26. Thereafter, motor 36 commences rotation, and lower auger 28 moves material from the two heaps 64, 66, to respective openings 76, 78, provided in the bottom of trough 10, and staggered to the right with respect to the upper discharge openings 46, 54. From openings 76, 78 the feed drops to suitable feeding troughs, indicated in general outline in the dash-line boxes, 80, 82. After a time interval sufficient to accomplish the dispensing, the motor 36 which operates the lower auger is automatically stopped.

The controls are indicated, in schematic form, in FIGURE 3, wherein 34, and 36 indicate the motors, as in FIGURE 1, and 74 indicates the limit switch, as in that figure. These are across the leads 84, 86, of the voltage source, but are controlled by switches as follows: The circuit for motor 34 is completed through a switch 87 operated by a relay 88, which is energized through an arcuate conductor segment 90 in a timer 92, the circuit being closed by a sweep arm 96, connected to the line 84 through a line 94. After opening of the limit switch 74, the motor of the lower auger is placed in operation by contact of the sweep arm 96 of the timer with a second conductor segment 98, spaced from the segment 90, and connected through a line 100 to a time-delay device 102, which connects with main line 86 through a line 104. The time-delay device, shown only in general outline, is of a type adapted to close a switch 106 in the line to motor 36, and permit it to open after a predetermined interval, and for this purpose is shown as connected to the switch through a link or pull-rod 108.

It will be understood that the particular control circuit shown is for illustrative purposes, and not intended as limiting, since various other arrangements and components are possible which will achieve the over-all mode of operation, which is to start the upper auger at the expiration of a selected time interval, stop it after proper charging of feed, start the lower auger after the upper auger has stopped, and stop the lower auger after a predetermined time interval.

Comparing the control circuit shown with the system in FIGURE 1, it will be seen that when the timer 92 brings the arm 96 into contact with segment 90, the motor 34 is started, and the feed carried to the discharge openings in the upper trough, where it drops, to form heaps in the lower trough, after which, pressure of the feed on plate 68 actuates limit switch 74 to open the circuit and stop the motor. If, for any reason, the limit switch fails to operate, the action in the upper trough will nevertheless be terminated when arm 96 moves off segment 90. Thereafter, motor 36 of the lower auger is started through action of delay device 102, the circuit of which is closed in timer 92 by contact of arm 96 with segment 98. This moves heaps 64 and 66 to discharge openings 76, 78, respectively, and after a suitable time interval sufficient for full discharge, the motor 36 is stopped by action of time-delay device 102. Meanwhile the sweep contact 96 has passed off segment 98, the cycle is complete, and the timer moves toward commencement of the next succeeding cycle.

Among other possible modifications in the control circuit, the time-delay device may be controlled directly by the limit switch, which would be constructed for alternative action.

Although augers have been shown, for purposes of illustration, other forms of conveyor, such as endless belt or chain systems are possible, and are contemplated. Also, although two feeding stations have been shown, these may be greater in number, and in this regard, the invention also contemplates a system wherein troughs, such as shown in FIGURE 1, may be provided in a form adapted for multiple attachment, in tandem, to suit any given requirement.

While a certain preferred embodiment has been shown and described, various modifications will be apparent, in the light of this disclosure, and the invention should no, therefore, be deemed as limited, except insofar as shall appear from the spirit and scope of the appended claims.

We claim:

1. A feeding device for animals, comprising a main trough of U-section mounted on standards, a plurality of trough sections secured to said main trough, in nested relation, said sections having top edges substantially coincident with the top edges of said main trough, and bottoms located medially of the depth of said main trough, and being spaced apart in a direction longitudinally of said main trough, to define discharge openings, a pair of augers having shafts journalled in said standards on vertically spaced axes, located, respectively above and below the bottoms of said trough sections, said main trough having discharge openings in its bottom, each staggered with respect to one of the respective discharge openings between said sections, power means to rotate the augers, and control means for said power means comprising a cut-off switch responsive to pressure of material fed by the upper auger, to stop the upper auger, a second switch and a timing means for controlling said upper auger, and a switch and a time-delay device for controlling said lower auger, the first-mentioned timing means being arranged for alternative operation of said augers.

2. In a device as in claim 1, a plurality of trough sections nested in the first-mentioned trough section, and arranged for sliding movement, to vary the size of the first-mentioned discharge openings.

3. A feeding device for animals, comprising a main trough of U-section mounted on standards, a plurality of trough sections secured to said main trough in nested relation, said sections having top edges substantially coincident with the top edges of said main trough, and bottoms spaced from the bottom of said main trough, and being spaced apart in a direction longitudinally of said main trough, to define a plurality of upper discharge openings, a plurality of trough sections nested in the first-mentioned sections, and arranged for sliding movement, to vary the sizes of said discharge openings, a first conveyor means within said sections, a second conveyor means in said main trough below said sections, both adapted to move feed longitudinally of the trough, said main trough having discharge openings in its bottom, taggered with respect to said upper discharge openings in the direction of feed of said second conveyor means, a time switch controlling operation of said first conveyor means, means responsive to pressure of conveyed material to inactivate said first conveyor means, a switch including a time-delay device for actuation of said second conveyor means, and means providing for alternative energizing of the two conveyor means.

4. A feeding device for animals, comprising a main trough mounted on standards, a plurality of trough sections secured to said main trough, in nested relation, said sections having bottoms spaced from the bottom of said main trough, and being spaced apart in a direction longitudinally of said main trough, to define a plurality of upper discharge openings, a plurality of trough sections nested in the first-mentioned sections, and arranged for sliding movement, to vary the sizes of said discharge openings, a first conveyor means within said sections, a second conveyor means in said main trough below said sections, both adapted to move feed longitudinally of the trough, said main trough having discharge openings in its bottom, staggered with respect to said upper discharge openings in the direction of feed of said second conveyor means, a time switch controlling operation of said first conveyor means, means responsive to pressure of conveyed material to inactivate said first conveyor means, a switch for actuation of said second conveyor means, and means providing for alternative energizing of the two conveyor means.

5. A feeding device for animals, comprising a main trough mounted on standards, a plurality of trough sections secured to said main trough, in nested relation, said sections having bottoms spaced from the bottom of said main trough, to define a plurality of upper discharge openings, a plurality of trough sections nested in the first-mentioned sections, and arranged for sliding movement, to vary the sizes of said discharge openings, a first conveyor means within said sections, a second conveyor means in said main trough below said sections, both adapted to move feed longitudially of the trough, said main trough having discharge openings in its bottom, staggered with respect to said upper discharge openings, a time switch controlling operation of said first conveyor means, means responsive to pressure of conveyed material to inactivate said first conveyor means, a switch for actuation of said second conveyor means, and means providing for alternative energizing of the two conveyor means.

6. A feeding device for animals, comprising a main trough mounted on standards, a plurality of trough sections secured to said main trough, in nested relation, said sections having bottoms spaced from the bottom of said main trough, and being spaced apart in a direction longitudinally of said main trough, to define a plurality of upper discharge openings, a plurality of trough sections nested in the first-mentioned sections, and arranged for sliding movement, to vary the sizes of said discharge openings, a first conveyor means within said sections, a second conveyor means in said main trough below said sections, both adapted to move feed longitudinally of the trough, said main trough having discharge openings in its bottom, staggered with respect to said upper discharge openings, means for actuating the first, upper conveyor means for a first predetermined period of time, means for actuating the second, lower conveyor means, after termination of said first period of time, for a second period of time, means responsive to pressure of conveyed material to stop said first conveyor means, and a time-delay device controlling movement of said second conveyor means.

7. A feeding device for animals comprising an upper and a lower trough, arranged in parallel relation, said upper trough having a series of spaced discharge openings in its bottom, conveyor means above and below said openings, said lower trough having openings in its bottom staggered with respect to the openings in said upper trough, means for actuating the first, upper conveyor means for a first predetermined period of time, means for actuating the second, lower conveyor means, after termination of said first period of time, for a second period of time, and time-delay means controlling movement of the lower said conveyor means.

8. A feeding device for animals comprising an upper and a lower trough, arranged in parallel relation, said upper trough having a discharge opening in its bottom, conveyor means above and below said upper trough, said lower trough having a discharge opening in its bottom, staggered with respect to the opening in said upper trough, means for actuating the first, upper conveyor means for a first predetermined period of time, means for actuating the second, lower conveyor means, after termination of said first period of time, for a second period of time, and time-delay means controlling movement of the lower of said conveyor means.

9. A feeding device for animals, comprising an upper and a lower trough, arranged in parallel relation, an auger extending in each trough, the underside of each trough being conformed to the contacting periphery of the auger to prevent accumulation of animal food, means for supporting said troughs and said augers in said troughs, power drive means for said augers, a plurality of spaced discharge openings in the upper trough, discharging into the lower trough, discharge openings in said lower trough corresponding in number to the openings in the upper trough and laterally spaced therefrom, a feed hopper discharging into said upper trough, control means for said power means including a cut-off switch responsive to accumulation of feed material fed by the upper auger, to stop the upper auger, a pair of switches, one for each augre and timing means for actuating the upper auger for a first predetermined period of time, timing means for activating the lower auger, after termination of said first period of time for a second period of time, through said switches.

10. The device of claim 9 including sliding means associated with the discharge openings in the upper trough, for measuring the amount of feed from said openings.

11. A feeding device for animals, comprising an upper and a lower trough, arranged in parallel relation, an auger extending in each trough, the underside of each trough being conformed to the contacting periphery of the auger to prevent accumulation of animal food, means for supporting said troughs and said augers in said troughs, power drive means for said augers, a plurality of spaced discharge openings in the upper trough, discharging into the lower trough, discharge openings in said lower trough corresponding in number to the openings in the upper trough and laterally spaced therefrom, a feed hopper discharging into said upper trough, a time switch controlling the power drive means for one of said augers, means responsive to the pressure of accumulated feed in the lower trough for inactivating the power drive means for the upper auger and means for activating the drive means for the upper auger for a first predetermined period of time, means for activating the drive means for the lower auger, after termination of said first period of time, for a second period of time.

References Cited by the Examiner
UNITED STATES PATENTS

| | | | |
|---|---|---|---|
| 2,373,838 | 4/45 | Lindholm | 177—120 |
| 2,631,760 | 3/53 | Hoppes | 222—238 |
| 2,657,831 | 11/53 | Pierce | 222—272 |
| 2,794,576 | 6/57 | Reynolds | 119—53 X |
| 2,926,629 | 3/60 | Hazen | 119—52 |
| 3,026,845 | 3/57 | Winter | 119—53 X |
| 3,119,526 | 1/64 | Sutton | 119—51.11 X |

SAMUEL KOREN, *Primary Examiner.*

CHARLES W. ROBINSON, HUGH R. CHAMBLEE,
*Examiners.*